United States Patent Office 2,925,358
Patented Feb. 16, 1960

2,925,358

NON-ACID ELECTROLYTE

Gus H. De Maio and George P. Peteler, Miami, Fla.

No Drawing. Application August 13, 1957
Serial No. 677,840

2 Claims. (Cl. 136—154)

This invention relates to electric storage batteries and more particularly to a novel non-acid electrolyte for use therein.

Conventional storage batteries having plates of lead and zinc and electrolyte comprising a sulphuric acid solution have a comparatively short life due to the fact that not only are the electrodes eaten away and destroyed but because of lead sulphate crystals deposited on the plates, after a relatively short period of time a sufficient amount of lead sulphate crystals are deposited in the battery case to short circuit the plates. Further, there exists a distinct need for an electrolyte solution which is operative at comparative low temperatures where the sulphuric acid electrolyte is incapable of satisfactory utilization.

It is therefore the primary object of the present invention to provide an electrolyte for use in electric storage batteries which does not employ sulphuric acid but employs magnesium sulphate and copper sulphate solution for producing OH ions while being capable of being mixed with a suitable non-foaming detergent for maintaining the plates free of lead sulphate or other crystalline deposits and which may be readily mixed with a suitable solution of an anti-freeze such as isopropyl alcohol without adversely affecting the proper operation of the battery.

Still further objects and features of this invention reside in the provision of an electrolyte for an electric storage battery that is easy to manufacture and produce, composed of readily available ingredients, and which will maintain a sufficient electrical output for the electric storage battery when the storage battery is in a charged condition.

These together with various ancillary objects and features of the invention will be understood by reference to the following description.

In producing the electric storage battery electrolyte comprising the present invention, 20 cc. of magnesium sulphate and 5 cc. of copper sulphate are boiled with 250 cc. of water for approximately twenty minutes. This aqueous solution of magnesium sulphate and copper sulphate is the major OH ion producing constituent of the electrolyte. 2 cc. of a non-foaming detergent, such as is commercially available under the trademark "All" and of the composition $CH_3(CH_2)_{10}CH_2OSO_2Na$, is simmered with 30 cc. of water for approximately fifteen minutes. The aqueous solution of the non-foaming detergent is then mixed with the aqueous solution of magnesium sulphate and copper sulphate and further mixed with an aqueous solution of blue methylene dye, which solution comprises 1 cc. of the dye which has been mixed and simmered with 30 cc. of water for approximately five minutes. The entire one-half liter of aqueous solution is then mixed with sufficient isopropyl alcohol to achieve a 10% solution by volume of the isopropyl alcohol. It is noted that utilizing the electrolyte mixed with a 10% solution of isopropyl alcohol, the batteries will not freeze and will satisfactorily operate at minus 20° F. while batteries having an electrolyte with a solution of 20% isopropyl alcohol will satisfactorily operate at minus 40° F.

The non-foaming detergent employs its detergent action to loosen up and remove sulphate particles which cling to the battery plates. The accumulation of lead sulphate on the battery plates is a normal chemical reaction in a battery containing an acid or electrolyte when the battery is being used or discharged. When the accumulation of lead sulphate becomes great, the battery becomes weak and re-charging is necessary. The re-charging removes the lead sulphate from the plates electro-chemically. However, many of the particles of lead sulphate will fall from the battery plates to the bottom of the battery and there form a sediment which may eventually short-circuit the battery. The utilization of the non-foaming detergent prevents the build up of the lead sulphate crystals on the battery plates and subsequent sedimentation while also preventing a coating of the battery plates by the isopropyl alcohol which would otherwise prevent proper operation of the battery. The copper sulphate and magnesium sulphate provides the necessary OH ions in the aqueous solution required for conductivity. The negative OH ions are attracted to the positive lead plates and the electrical energy is thus produced. The blue methylene dye provides a distinguishing color for the electrolyte.

It will be understood that various modifications and changes may be made in the preferred composition of the invention herein, and such modifications and changes are to be understood as part of this invention, as outlined in the following claims.

What is claimed as new is as follows:

1. A storage battery electrolyte characterized by its ability to maintain battery plates substantially free of crystalline deposits, consisting of approximately 4% by volume of magnesium sulphate, approximately 1% by volume of copper sulphate, about 0.4% by volume of a non-foaming detergent, not less than 10% by volume of alcohol, and the remainder water.

2. The method of making a storage battery electrolyte characterized by its ability to maintain a battery plate substantially free of crystalline deposits, which comprises adding 20 cc. of magnesium sulphate and 5 cc. of copper sulphate to 250 cc. of water, boiling such solution for about twenty minutes to provide a first solution, adding 2 cc. of a non-foaming detergent to 30 cc. of water and simmering such admixture for about fifteen minutes to provide a second solution, and then mixing the first and second solutions with enough isopropyl alcohol to produce a final solution containing not less than 10% isopropyl alcohol by volume.

References Cited in the file of this patent

UNITED STATES PATENTS

| 1,468,341 | Carter | Sept. 18, 1923 |
|---|---|---|
| 1,483,885 | Hoen | Feb. 19, 1924 |
| 1,652,945 | Klain et al. | Dec. 13, 1927 |
| 1,685,674 | Kelleker | Sept. 25, 1928 |
| 1,749,665 | Diltz | Mar. 4, 1930 |

FOREIGN PATENTS

| 1,755 | Australia | Sept. 14, 1926 |
|---|---|---|

OTHER REFERENCES

Battery Additives, N.B.S. Circular 504, Jan. 10, 1951, pp. 6 and 30.